United States Patent [19]
Chan et al.

[11] Patent Number: 4,584,646
[45] Date of Patent: Apr. 22, 1986

[54] SYSTEM FOR CORRELATION AND RECOGNITION OF TERRAIN ELEVATION

[75] Inventors: Luen C. Chan, Indian Harbor Beach; Franklin B. Snyder, Palm Bay, both of Fla.

[73] Assignee: Harris Corporation, Melbourne, Fla.

[21] Appl. No.: 509,052

[22] Filed: Jun. 29, 1983

[51] Int. Cl.⁴ .............................................. G06F 15/50
[52] U.S. Cl. .................... 364/449; 364/443; 364/728; 343/5 MM; 343/7 TA
[58] Field of Search ............... 364/433, 443, 449, 460, 364/423, 728; 244/3.15–3.18; 73/178 R; 343/5 MM, 5 DP, 7 TA, 378

[56] References Cited

U.S. PATENT DOCUMENTS

| | | | |
|---|---|---|---|
| 4,144,571 | 3/1979 | Webber | 343/7 TA |
| 4,179,693 | 12/1979 | Evans et al. | 343/5 MM |
| 4,224,669 | 9/1980 | Brame | 364/433 |
| 4,471,357 | 9/1984 | Wu et al. | 343/5 DP |
| 4,495,580 | 1/1985 | Keearns | 343/5 MM |

FOREIGN PATENT DOCUMENTS 2025723A 1/1980 United Kingdom ........... 343/5 MM

Primary Examiner—Gary Chin
Attorney, Agent, or Firm—Antonelli, Terry & Wands

[57] ABSTRACT

In a dead reckoning navigation system a correlation scheme that operates in the frequency domain (using a discrete cosine transform (DCT) function) is implemented separately from the navigation system to determine a two-dimensional position error estimate. In this separate processing system measured terrain data is correlated (in the frequency domain) with reference elevation stored in map format (as by way of a digital map generator (DMG)). The results of this correlation are then employed to enhance the independently operated dead reckoning navigation system so that an accurate determination of geographic position may be obtained.

8 Claims, 5 Drawing Figures

SYSTEM FOR CORRELATION AND RECOGNITION OF TERRAIN ELEVATION

FIELD OF THE INVENTION

The present invention relates to navigation systems and is particularly directed to an airborne navigation system that provides an accurate determination of the geographic position of a vehicle based upon a correlation of measured terrain elevation data and reference elevation data.

BACKGROUND OF THE INVENTION

Airborne vehicle nap-of-the-earth (NOE) flight requires precise pilot control to avoid obstacles and elevated terrain. While the pilot normally relies on good visibility to perform the NOE function, requirements exist for NOE flight during periods of less than good visibility (poor weather or night time conditions). Much practical work has been done on obstacle avoidance systems in which sensors automatically detect physical threats in the flight path—particularly wires; the remaining task necessary to effect NOE flight during periods of zero or poor visibility is navigation.

Airborne (e.g. helicopter) navigation systems are typically of the dead reckoning (DR) variety, usually based on doppler radar and compass systems, and while these systems offer excellent short term guidance capability, they exhibit unacceptable long term position error growth, so that some form of in-flight correction procedure, such as periodic position updating of the dead reckoning navigation system, is necessary. Unfortunately, currently available radio aids (even assuming their presence in the vehicle's operational area) are generally unsatisfactory to support NOE flight conditions where line of sight communications is not possible.

One proposal to solve this problem has been the concept of employing terrain correlation techniques whereby the aircraft's position as determined by its navigation system is updated as a function of overflown terrain and its elevation heights and height variations. Examples of such terrain correlation schemes include TERrain Contour Matching (TERCOM) and Sandia Inertial Terrain Aided Navigation (SITAN). (For a discussion of TERCOM and SITAN proposals that have been investigated, attention may be directed to articles entitled "Continuous Kalman Updating of an Inertial Navigation System Using Terrain Measurements" by R. D. Andreas et al., Sandia National Laboratories, pg. 1263-1270, 1978 IEEE; "An Alternative Approach for Terrain-Aided Navigation Using Parallel Extended Kalman Filters" by T. C. Sheives et al., Sandia National Laboratories, Albuquerque, N. Mex., Dec. 1979; and "Application of Multiple Model Estimation Techniques to a Recursive Terrain Height Correlation System" by W. Tang et al., pg. 757-764, IEEE 1981. Also, attention may be directed to the U.S. patents to Evans et al. U.S. Pat. No. 4,179,693; Webber U.S. Pat. No. 4,144,571; Thomas et al. U.S. Pat. No. 4,103,847; and Blatchford U.S. Pat. No. 3,992,613 for further background information that provides an illustration of conventional guidance and navigation systems that compare altimeter information with stored data for guidance.)

Unfortunately both of the TERCOM and SITAN approaches suffer from a number of drawbacks which limit their performance and accuracy. For example, in the TERCOM system, navigation accuracy is limited by the correlation distance $S_T$, which is defined by using the covariance function in the spatial domain. It is usually a function of terrain characteristic and is typically on the order of several hundred meters. Such a long correlation distance limits the use of TERCOM for high-precision navigation systems (such as a helicopter-borne NOE system which requires an accuracy on the order of 100 m). In order to achieve good accuracy using TERCOM, a long integration path length, typically on the order of 10Km, must be used. Such a long integration distance requires that an extremely large quantity of terrain data be stored for the terrain correlation. The TERCOM correlation algorithms that are currently being employed are incapable of providing good accuracy in a high noise environment, such as a highly inaccurate inertial navigation system (INS) that contains large velocity, altitude, acceleration and gyro, etc. errors. Finally, existing TERCOM systems store non-compressed terrain data for terrain correlation, which limits the practical ground coverage of the navigation system.

In the SITAN system, terrain linearization is required such that a linearized terrain measurement model can be incorporated into Kalman filter of the navigation system. As a result of the linearization process, the filter has a small region of convergence, and thus diverges when the navigation system is required to operate with a large uncertainty region (e.g. after a period of overwater navigation, or at the start of the navigation process). Usually, the SITAN system diverges when the uncertainty region is larger than several hundred meters. In addition, the SITAN system stores data for terrain correlation in a non-compressed format, so that for long missions, data storage becomes a problem.

SUMMARY OF THE INVENTION

In accordance with the present invention, the deficiencies of conventional terrain correlation approaches to navigation (such as TERCOM and SITAN, referenced above) are obviated by a correlation scheme that operates in the frequency domain (using the discrete cosine transform (DCT)). The correlation process according to the present invention is implemented separately from the navigation system to determine a two-dimensional position error estimate. In this separate processing system measured terrain data is correlated in the frequency domain with reference elevation stored in map format (as by way of a digital map generator (DMG)). The results of this correlation are then employed to enhance the independently operated navigation system so that an accurate determination of geographic position may be obtained.

Because mathematical manipulation is carried out in the frequency domain meaningful selection of data sample intervals and data quantities for evaluation to accommodate varying (perceived) terrain and sensor dependent decorrelation distances is possible. Previous approaches, such as TERCOM and SITAN, have not properly recognized the terrain distance decorrelation phenomenon and/or have not been successful in accommodating it. Furthermore, operation in the frequency domain permits practical use of the relatively high energy (information) content found in the lower frequencies without the attendant problem of (higher) frequency aliasing and noise. Prior proposals in the elevation domain have not been able to effectively use the low frequency data. With the ability to choose frequencies of interest, elimination of selected frequencies is also possible. The elimination of the lowest frequency, the DC term, inherently compensates for any undesirable steady-state bias in any of the data.

Because correlation/position error estimates are determined separately from the primary navigation process, the performance of the navigation system is not compromised. A hybrid mechanization (combining the position error estimates with the DR system) is preferably implemented by means of a statistical (KALMAN) filter in which the error states are devoted to the DR system and sensor parameters. Unlike a conventional SITAN system, mentioned previously, this filter is not involved with the correlation process where the required statistical modelling of the (perceived) terrain elevation characteristics has been a very serious problem, primarily because of the differing terrain characteristics among different geographical areas.

Moreover, since the correlation process operates independently of the DR system and is free to operate in non-real-time, DR system performance is not compromised when the correlation process requires varying lengths of time to generate an error estimate. This ability to vary the length of the time interval required for data collection and/or processing helps considerably in the accommodation of dynamic terrain decorrelation distances, vehicle velocity and non-linear vehicle trajectories. This mechanization also accommodates periods of inoperability of the correlation process without adversely impacting the DR system performance. Examples are over-water flight (where no dynamic altimetry data is available) and during periods of radar altimeter silence (where the radar emissions could compromise a military mission). Many of the previous efforts, and particularly notably the recent referenced efforts, do not permit periods of inoperation of the correlation process.

DETAILED DESCRIPTION

Figure 1:
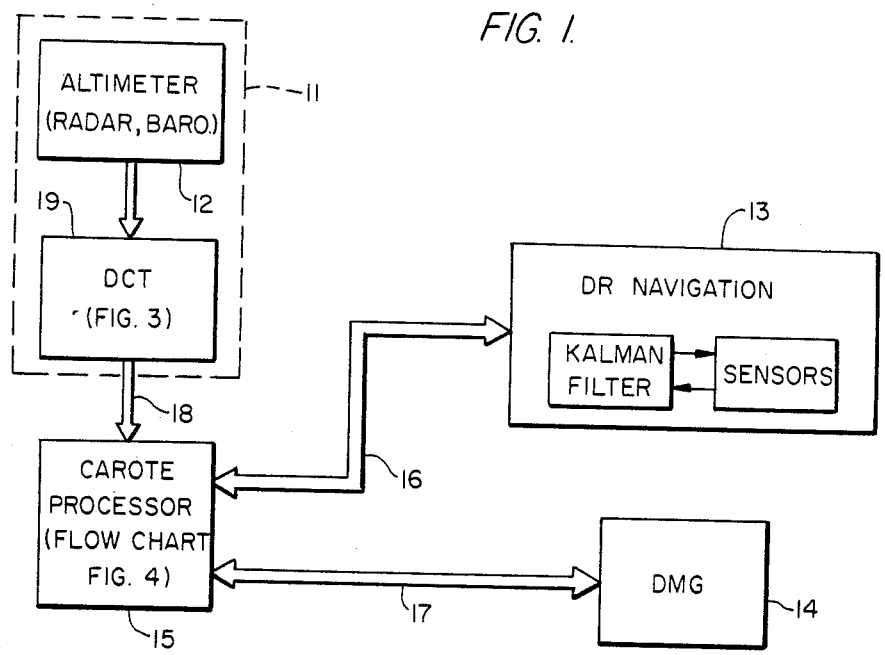
FIG. 1 is a block diagram of a correlation and recognition of terrain elevation (CAROTE) system according to the present invention.

Referring now to FIG. 1 of the drawings there is illustrated a block diagram of a navigation system coupled with a position updating system according to the present invention that carries out correlation and recognition of terrain elevation (CAROTE). The primary navigation component is a dead reckoning (DR) navigation system 13 including Kalman filter and sensor units as conventionally employed in aircraft guidance systems. Typically, such navigation systems may provide velocity and position data and they are responsive to error estimate and confidence level signals for correcting or improving their real time operation. Since an understanding of the configuration and operation of the present invention does not require a detailed explanation of such a DR navigation system, that portion of the overall embodiment of FIG. 1 will not be described here. For informational background, however, reference may be had to published literature, such as that referenced above, for a basic illustration and operation of such navigation systems.

Associated and used in conjunction with the DR navigation system 13 is a digital map generator (DMG) 14 that provides elevation information such as may be stored in a scene memory, which is used to generate correlation coefficient data to be processed in the position error estimate determination as will be described infra. DMG 14 may be of the type described in copending application Ser. No. 641,179 filed Aug. 15, 1984 which is a continuation of application Ser. No. 224,742, by Paul Beckwith et al. entitled "Digital Map Generator and Display System", filed Jan. 13, 1981, now abandoned, and assigned to the assignee of the present application. Advantageously, the hardware of the DMG described in that application is capable of producing, from stored elevation data, the correlation coefficient data, thereby simplifying the implementation and tasks of an associated CAROTE processor 15.

The CAROTE processor 15 itself is coupled to the DR navigation system 13 and the DMG 14, over links 16 and 17, respectively. It is also coupled over link 18 to an actual position altimeter-based coefficient generator 11 that is comprised of an elevation signal source (e.g. radar altimeter, barometric altimeter) 12 and an altimeter data frequency coefficient generator 19. Generator 19 (to be described in detail below in conjunction with FIG. 3) is configured to implement a discrete cosine transformation (DCT) in response to elevation data supplied by altimeter 12 and to supply derived correlation coefficients over link 18 to CAROTE processor 15. On the basis of the two sets of coefficients supplied from generators 11 and 14, as well as the position data provided by the DR navigation system 13, CAROTE processor 15 produces position error estimates to the DR navigation system 13.

CAROTE processor 15 preferably comprises a commercially available microprocessor and associated memory for executing the frequency domain correlation functions pursuant to the invention, and operates effectively independently of the aircraft's navigation system 13. A flow chart of the signal processing and computational procedure that is carried out by CAROTE processor 15 will be described below with reference to FIG. 4. Prior to that description, however, an explanation of the basic frequency domain correlation technique of the invention and its impact on the navigation system will be presented.

As described above, the correlation and recognition of terrain elevation (CAROTE) technique in accordance with the present invention provides a position update to a navigation system. This position update includes position error estimates in the form of a pair of orthogonal coordinate offsets ($\Delta x$, $\Delta y$) to be used by the navigation system 13 in correcting or refining its operation. This position update information is obtained by carrying out a terrain elevation data correlation process in the discrete cosine frequency domain. The correlation function itself is defined by an expression (1) set forth as follows:

$$R(\Delta x, \Delta y) = 1 - \frac{\sum_{k=K_1}^{K_2}[W(k)C(k) - W'(k)C'(k, \Delta x, \Delta y)]^2}{\sum_{k=K_1}^{K_2}[W(k)C(k)]^2 + [W'(k)C'(k, \Delta x, \Delta y)]^2} \quad (1)$$

where:

$\Delta x, \Delta y$ = incremental offsets in orthogonal x and y directions, respectively, from a reference position $P(x,y)$ as determined by the DR navigation system;

$W(k), W'(k)$ = prescribed frequency weighting coefficients (1, or 0);

$C(k), C'(k, \Delta x, \Delta y)$ = discrete cosine transform coefficients generated from actual measured altimeter data and stored offset elevation data, respectively; and $K_1, K_2$ = frequency region of operation. Typically, $K_1 = 1$, $K_2 = 31$.

Figure 1A:
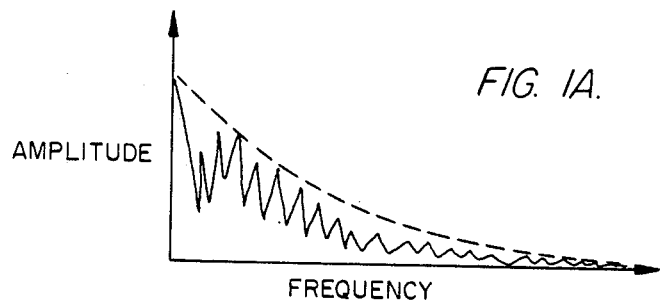
FIG. 1A shows an amplitude vs. frequency characteristic for a typical plot of discrete cosine transform (DCT) values.

The choice of K1 and K2 is based upon the spectral content of a typical plot of DCT values and the capability of the invention to selectively focus upon or delimit the range of frequency investigation so as to filter out bias and noise. More particularly, as shown in FIG. 1A, which shows an amplitude vs. frequency characteristic for a typical plot of DCT values, the largest component in the DCT domain is at zero frequency, or the DC term. This term may be considered to correspond singularly to the absolute altitude (above sea level); also, wholly contained in this term is the barometric pressure dependent error of the barometric altimeter. The highest frequencies on the other hand, are seen to contain little information as compared to that in the lower frequencies (and ignoring the DC term). Therefore K1 and K2 are chosen to define a frequency window that filters out the unwanted and less useful terms.

Thus, operating in the frequency (DCT) domain enables the invention to selectively investigate frequencies of interest in the elevation cross-correlations; it also permits meaningful selection of data sample intervals and data quantities for elevation to accomodate varying terrain and sensor dependent decorrelation distances.

Now, the discrete cosine transform coefficients $C(k)$ and $C'(k, \Delta x, \Delta y)$ to be employed in the basic correlation equation (1) above are defined by equations (2) and (3), respectively, as follows:

$$C(k) = \frac{1}{\epsilon_k} \sum_{k=0}^{N-1} z(m) \cos\left[\frac{(2m+1)k\pi}{2N}\right] ; N = 32 \quad (2)$$

$$C'(k) = \frac{1}{\epsilon_k} \sum_{k=0}^{N-1} z'(m, \Delta x, \Delta y) \cos\left[\frac{(2m+1)k\pi}{2N}\right] ; N = 32 \quad (3)$$

where $\epsilon_k = 2$ for $k=0$, $\epsilon_k = 1$ for $k \neq 0$.

As can be seen from equation (3), the value of DCT coefficient $C'(k, \Delta x, \Delta y)$ will depend upon an incremental offset of the position (in x and y coordinates) of the elevation measurement relative to position data supplied by the navigation system. This offset elevation data is derived from an on-board memory (here the DMG) that is accessed to provide a matrix or grid of elevation values covering a prescribed geographical area centered about the aircraft's position $P(x,y)$ as originally determined by the DR navigation system 13.

Figure 2:
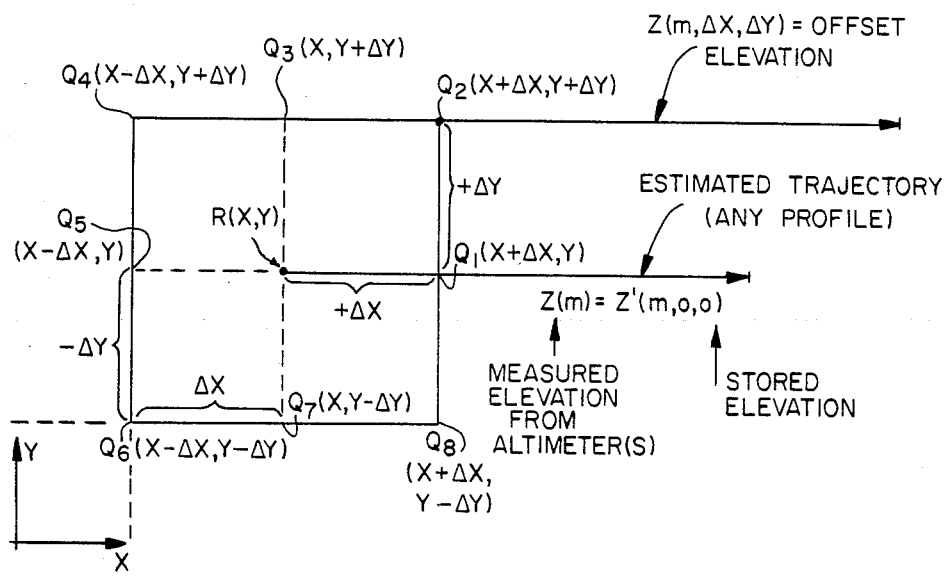
FIG. 2 shows a portion of a terrain map containing a group of adjacent coordinate positions for the purpose of explaining the iterative position error process in accordance with the invention.

More particularly, referring to FIG. 2, there is shown a portion of a terrain map containing the current flight path position $P(x,y)$ of the aircraft as derived by the navigation system, and a plurality of surrounding locations $Q_1$-$Q_8$. Namely, over a prescribed area (e.g. $(2km)^2$) centered about this point $P(x,y)$, there may be established a well defined matrix or grid of adjacent terrain locations or positions each of which is offset from the other by a preestablished lineal displacement of $\Delta x, \Delta y$. As mentioned above, eight such locations or positions ($Q_1$-$Q_8$) surrounding joint $P(x,y)$ are shown in FIG. 2. In terms of the practical capability of scene storage and desired system resolution using the DMG, the overall grid may be selected to cover a $4Km^2$ area, or $\pm 1Km$ in the x and y directions about position $P(x,y)$, with $\Delta x$ and $\Delta y$ increments selected to be, for example, 50 m. each. Thus, in the illustration provided in FIG. 2, position $Q_2$ is offset 50 m ($\Delta x$) in the x direction and 50 m ($\Delta y$) in the y direction from point $P(x,y)$, and from the stored elevation data stored in the DMG there is obtained an elevation value (m, $\Delta x, \Delta y$) to be used in determining the value of DCT coefficient $C'(k, \Delta x, \Delta y)$ in equation (3) at that point $Q_2$, displaced from position $P(x,y)$.

In accordance with the invention, a family of such coefficients is derived in accordance with the expression in equation (3) for each of the grid or matrix positions $Q_1 \ldots Q_j$ surrounding the flight path position of the aircraft as currently determined by the navigation system. The $\pm 1$km area (in both the x and y directions) and the 50 m spacings of the present example yields a total of 1,600 grid locations. Using a family of coefficients respectively corresponding to these 1,600 grid locations the correlation process expressed in equation (1) is carried out and the maximum value of $R(\Delta x, \Delta y)$ obtained by processing these 1,600 positions is selected to locate the true position of the aircraft. In this process the expression (4) below will hold.

$$-1 \leq R(\Delta x, \Delta y) \leq 1 \quad (4)$$

With $R(\Delta x, \Delta y)$ maximized, then the difference between the coordinate positions for $R(\Delta x, \Delta y)$max and $P(x,y)$ represents the position offset error to be supplied to the aircraft's navigation system (here, DR navigation system 13) for correction or enhancement.

Figure 3:
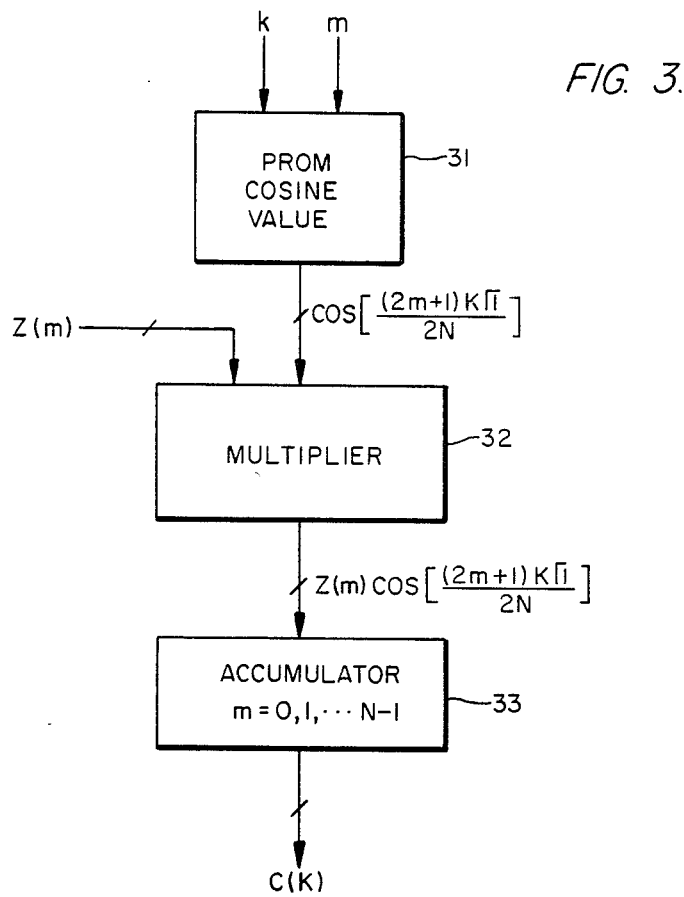
FIG. 3 is a block diagram of the components of the discrete cosine transform generator of FIG. 1.

FIG. 3 shows a block diagram of hardware components of which the DCT coefficient generator may be comprised. It should be understood however, that the generation of the DCT coefficients may also be carried out using a suitable programmed processor supplied with digital data corresponding to those applied to the hardware configuration of FIG. 3. Moreover, it is to be observed that while FIG. 3 shows the configuration of DCT generator 19 in FIG. 1, it is similarly useful for the DCT embodied in DMG 14. As mentioned previously, because of the circuitry make up of the DMG as described in the above-referenced copending patent application, hardware for implementing the DCT function represented by the units of FIG. 3 is readily available in DMG 14.

The initial element of the generator is a PROM or lookup table 31 in which there is stored a table of cosine values to be multiplied by altimeter data from unit 12. The address inputs to PROM 31 are the values of k (frequency index varying between 0-31) and m (terrain sample index, varying from 0 to 31) to be used for computing the expression $$\cos\left[\frac{(2m+1)k\pi}{2N}\right].$$

For the present implementation N may cover 32 values to give satisfactory accuracy. Measured digital altimeter data z(m) together with the cosine value output from PROM 31 are multiplied together in multiplier 32 to obtain the product $$z(m)\cos\left[\frac{(2m+1)k\pi}{2N}\right]$$

and successive values of this product are totalled or summed together in accumulator 33 over a span of N (e.g. 32) values to establish a total for the coefficient C(k). It is to be observed that the coefficient generator configuration of FIG. 3 is equally suitable for generating coefficients for offset values of $\Delta x$, $\Delta y$, i.e. from the elevation data values from the DMG 14. In this circumstance the multiplier of the cosine value is $z(m,\Delta x,\Delta y)$, or offset elevation value, rather than the digitized altimeter output. The resulting coefficient C'(k) as defined by equation (3) above is thereby obtained.

Figure 4:
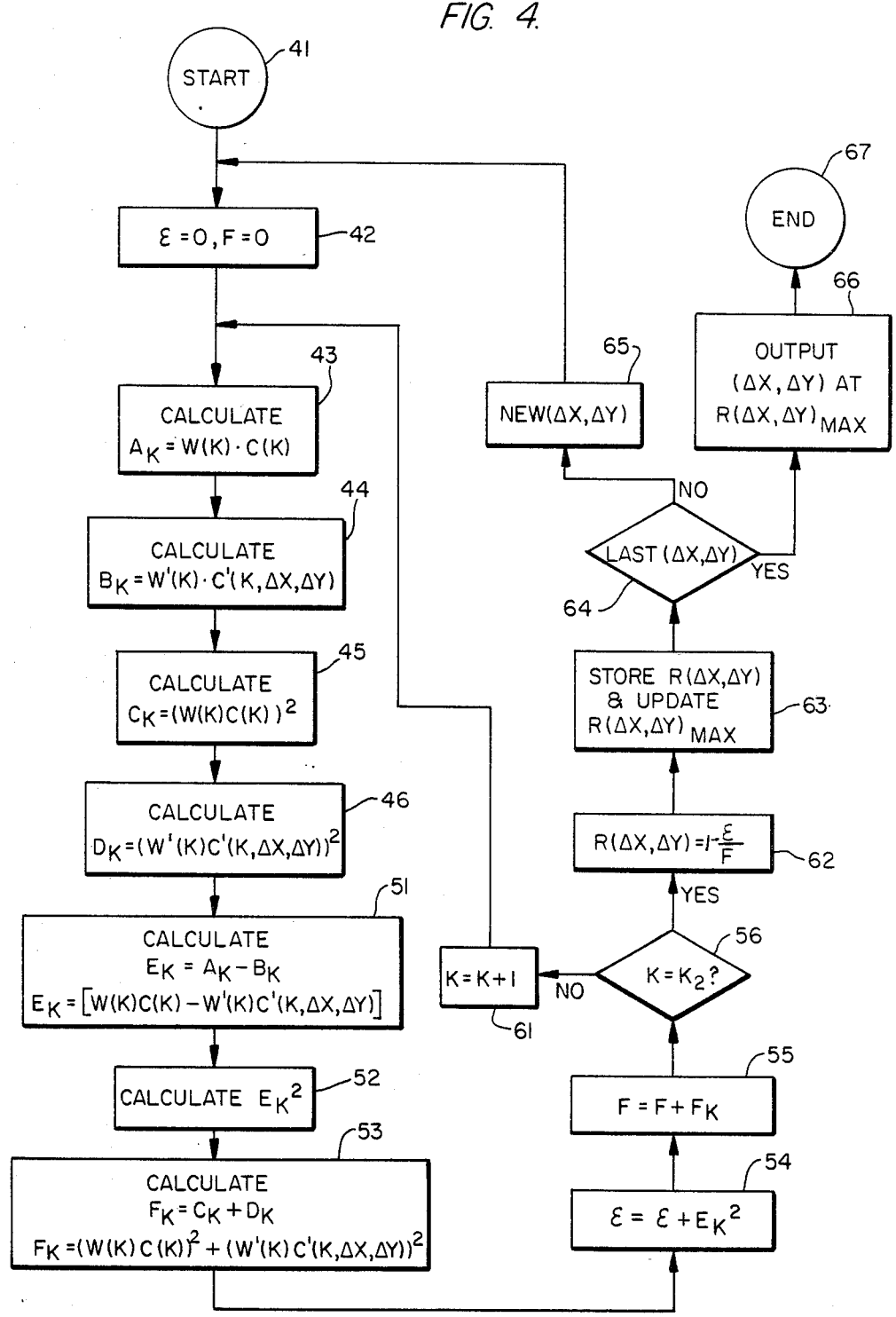
FIG. 4 is a flow chart for explaining the operation of the CAROTE processor to obtain error position update information.

Referring now to the flow chart shown in FIG. 4, the manner in which CAROTE processor 15 carries out the correlation ratio expression of equation (1) and provides position updates to the navigation system will be described. At a starting point 41, the processor enters the routine for calculating the expression set forth in equation (1), above, beginning at a prescribed geographical offset from the navigation position P(x,y) by a value establishing the boundaries of the area of terrain in which the subdivisions $\Delta x$, $\Delta y$ are identified, as explained above in conjunction with FIG. 2. For a square geographical terrain area ($\pm$1km in the x and y directions) centered about location P(x,y) the routine starts at one corner of a matrix or grid covering this area and then proceeds through the flow chart of FIG. 4.

Next, at step 42, the values of the numerator and the denominator of expression (1) are initially cleared or set at zero. Here the numerator is represented by $\epsilon$ and the denominator is represented by F.

Given the coefficient data supplied by the DCT coefficient generators, an initial expression $$A_k = W(k) \cdot C(k)$$

is calculated at step 43. Then, at step 44, a similar expression $$B_k = W'(k) \cdot C'(k, \Delta x, \Delta y)$$

is generated. The values obtained in steps 43 and 44 are then squared to obtain values $C_k$ and $D_k$, respectively, in steps 45 and 46.

The processor then derives the difference between $A_k$ and $B_k$ obtained in steps 43 and 44 to produce a value of $E_k$, as shown in step 51. This value is then squared in step 52 to produce $E_k^2$. Then, at step 53, the values obtained in steps 45 and 46 are added together to produce the value of $F_k$ for the terrain point of interest.

Next, in steps 54 and 55, the currently stored values of the numerator and the denominator of the expression of equation (1) are updated by the values of $E_k^2$ and $F_k$ obtained in steps 52 and 53.

Step 56 inquires as to whether the calculation has reached the upper boundary of the coefficient range (i.e. does $k=K_2$?). If not, (and at the beginning, this is not the case), the value of k is incremented in step 61 and the above process (steps 43–55) is repeated. Eventually, the values of the numerator and the denominator in equation (1) are finally determined, so that the answer to step 56 is YES and the processor proceeds to execute step 62, wherein the value of E is divided by the value F, to thereby obtain the value for the expression $R(\Delta x, \Delta y)$. This value is then stored and a determination is made as to whether or not this value is the maximum value that has been stored in step 63. For the initial point in the selected terrain grid matrix of interest, this value will necessarily be the maximum value, since it is the only point that has been thus far evaluated. However, step 64 then inquires whether the complete matrix has been processed. For the initial point, the answer to question 64 is negative, so that an adjacent point, incremented in the $\Delta x$ or $\Delta y$ direction by the terrain offset distance (for example 50 meters) is employed to derive a new ($\Delta x, \Delta y$) value and thereby identify a new adjacent point of the terrain map. Once this has taken place in step 65, the process returns to step 42 and the above sequence is reexecuted.

Eventually, as respective values $R(\Delta x, \Delta y)$ are obtained and its maximum value is updated each time step 64 is executed, the entire grid or matrix of terrain points will have been evaluated. Then the output of step 64 will be YES and the flow chart proceeds then to step 66 wherein the processor 15 supplies the actual offset values ($\Delta x$ and $\Delta y$) to the dead reckoning navigation system 13. Also supplied is an indication of the confidence (in terms of the value of $R(\Delta x, \Delta y)MAX$) that these values are accurate, for enhancing the operation of the navigation system 13. The navigation system 13 is now updated and the processing flow proceeds to end step 67.

Through the above procedure, the navigation system may proceed to control, in real time, the guidance of the vehicle (e.g., a helicopter) while the coefficient determination and correlation calculations are carried out separately by the CAROTE processor 15 and not confined to the real time of the navigation system. Altimeter data is updated only as required, as the signal processing is not tied up or limited by continuous interaction with the navigation system.

Since all error calculations can be done in non-real time after the measured path data is collected by the navigation system 13 (in real time), several advantages, as compared to conventional navigation updating systems, are obtained. Altimetry data can be gathered independently of the dead reckoning navigation system mechanization, as only dead reckoning velocity (position) and heading may be supplied to geographically locate the altimetry measurements. Error determination calculations can be performed at any time after the data has been collected as long as its accuracy is maintained. Moreover, altimeter operations can be intermittent (such as an over-water flight or in the presence of enemy threats) and the dead reckoning navigation system can be surrounded by a statistical (Kalman) filter, the complexity of which is determined by the specific application, which has correctional inputs in the form of position errors. It may be determined later that certainty or quality of the error inputs may be additional input factors to the navigation system.

While we have shown and described an embodiment in accordance with the present invention, it is understood that the same is not limited thereto but is susceptible of numerous changes and modifications as known to a person skilled in the art, and we therefore do not wish to be limited to the details shown and described herein but intend to cover all such changes and modifications as are obvious to one of ordinary skill in the art.

What is claimed is:

1. For use with a vehicle guidance system in which geographic position data is supplied from a navigation system, an arrangement for providing said navigation system with error estimates in geographic position data supplied thereby comprising:

first means for generating first signals representative of a discrete cosine transform function based upon the measured elevation of the terrain at the geographic position of the vehicle; and second means for correlating, in the discrete cosine transform domain, the first signals generated by said first means with a set of second signals representative of respective discrete cosine transform functions based upon data representative of the elevations of a plurality of geographic positions disposed about the geographic position of said vehicle as identified by data supplied from said navigation system, and producing, from said correlation of said first and second signals, third signals representative of the error estimates of position data supplied by said navigation system corresponding to said identified geographic position, a selected one of said third signals being coupled to said navigation system for updating the information processed thereby for the guidance of said vehicle.

2. An arrangement according to claim 1, wherein said vehicle guidance system includes means for storing elevation data in the form of a terrain profile map encompassing a prescribed geographical area within which the travel path of said vehicle is located, and for extracting from said map data representative of the elevations of said plurality of geographic positions.

3. An arrangement according to claim 1, wherein said second means comprises means for producing as said third signals, signals representative of the expression $$R(\Delta x, \Delta y) = \frac{\sum\limits_{k=K_1}^{K_2} [W(k)C(k) - W'(k)C'(k, \Delta x, \Delta y)]^2}{\sum\limits_{k=K_1}^{K_2} [W(k)C(k)]^2 + [W'(k)C'(k, \Delta x, \Delta y)]^2}$$

wherein:

$\Delta x$ and $\Delta y$ are respective orthogonal offsets corresponding to the displacements in orthogonal geographic directions among adjacent ones of said plurality of geographic positions, $W(k)$ and $W'(k)$ are frequency weighting coefficients, $C(k)$ corresponds to said first signals;

$C'(k, \Delta x, \Delta y)$ corresponds to said second signals; and $K_1$ and $K_2$ define the boundaries of said frequency domain.

4. An arrangement according to claim 3, wherein said second means further comprises means for coupling to said navigation system, as said selected one of said third signals, that third signal whose value $R(\Delta x, \Delta y)$ is maximum for said plurality of geographic positions.

5. For use with vehicle guidance system in which geographic position data is supplied from a navigation system, a method for providing said navigation system with error estimates in geographic position data supplied thereby comprising the steps of:

(a) generating first signals representative of a discrete cosine transform function based upon the measured elevation of the terrain at the geographic position of the vehicle, (b) correlating, in the discrete cosine transform domain, the first signals generated in step (a) with a set of second signals representative of respective discrete cosine transform functions based upon data representative of the elevations of a plurality of geographic positions disposed about the geographic position of said vehicle as identified by data supplied from said navigation system, and (c) producing, from the correlation of said first and second signals, third signals representative of the error estimates of position data supplied by said navigation system corresponding to said identified geographic position, a selected one of said third signals being coupled to said navigation system for updating the information processed thereby for the guidance of said vehicle.

6. A method according to claim 5, wherein, within said vehicle guidance system there are stored elevation data in the form of a terrain profile map encompassing a prescribed geographical area within which the travel path of said vehicle is located, and from said map data representative of the elevations of said plurality of geographic positions are extracted.

7. A method according to claim 5, wherein step (b) comprises producing, as said third signals, signals representative of the expression $$R(\Delta x, \Delta y) = 1 - \frac{\sum\limits_{K=1}^{K_2} [W(k)C(k) - W'(k)C'(k, \Delta x, \Delta y)]^2}{\sum\limits_{k=K_1}^{K_2} [W(k)C(k)]^2 + [W'(k)C'(k, \Delta x, \Delta y)]^2}$$

wherein:

$\Delta x$ and $\Delta y$ are respective orthogonal offsets corresponding to the displacements in orthogonal geographic directions among adjacent ones of said plurality of geographic positions, $W(k)$ and $W'(k)$ are frequency weighting coefficients, $C(k)$ corresponds to said first signals;

$C'(k, \Delta x, \Delta y)$ corresponds to said second signals; and $K_1$ and $K_2$ define the boundaries of said frequency domain.

8. A method according to claim 7, wherein said selected one of said third signals is that third signal whose value $R(\Delta x, \Delta y)$ is maximum for said plurality of geographic positions.

* * * * *